US009835293B2

(12) United States Patent
Prescott et al.

(10) Patent No.: US 9,835,293 B2
(45) Date of Patent: Dec. 5, 2017

(54) SYSTEMS AND METHODS FOR PROCESSING GEOTHERMAL LIQUID NATURAL GAS (LNG)

(71) Applicant: FLUOR TECHNOLOGIES CORPORATION, Aliso Viejo, CA (US)

(72) Inventors: Clifford Neal Prescott, Houston, TX (US); Jeff (Jianfeng) Zhang, Sugar Land, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 621 days.

(21) Appl. No.: 14/156,334

(22) Filed: Jan. 15, 2014

(65) Prior Publication Data
US 2014/0246167 A1  Sep. 4, 2014

Related U.S. Application Data

(60) Provisional application No. 61/752,885, filed on Jan. 15, 2013.

(51) Int. Cl.
*F24J 3/08* (2006.01)
*F17C 7/04* (2006.01)
(Continued)

(52) U.S. Cl.
CPC ............. *F17C 7/04* (2013.01); *F16L 39/00* (2013.01); *F16L 59/182* (2013.01); *F17C 5/06* (2013.01);
(Continued)

(58) Field of Classification Search
CPC .. F28D 7/103; F28D 7/106; F28D 7/10; F24J 3/08; F24J 3/081; F24J 3/082; F24J 3/083;
(Continued)

(56) References Cited

U.S. PATENT DOCUMENTS 2,240,311 A * 4/1941 Mills ............... F02M 31/16
123/553
3,275,345 A * 9/1966 Waldron ............... F16L 39/005
138/148
(Continued)

FOREIGN PATENT DOCUMENTS

WO  2005/119150  12/2005

OTHER PUBLICATIONS

Patent Cooperation Treaty, "Notification of Transmittal of the International Search Report and the Written Opinion of the International Searching Authority, or the Declaration", KIPO, PCT Application No. PCT/US2014/011725, dated Apr. 18, 2014.
(Continued)

*Primary Examiner* — Jianying Atkisson
*Assistant Examiner* — Jose O Class-Quinones
(74) *Attorney, Agent, or Firm* — Conley Rose, P.C.

(57) ABSTRACT

Regasification systems and processes for converting liquid natural gas (LNG) from a liquid into a gaseous state are described. The process includes a closed-loop system that uses geothermal wells as a heat source. A warming fluid circulates through the closed-loop system coupled with a geothermal well and a LNG heat exchanger. The warming fluid is heated as it passes through the geothermal well and cooled as it passes through the LNG heat exchanger, thus heating and gasifying the LNG. The cooled warming fluid then returns to the geothermal well. The closed-loop system minimizes environmental impact by eliminating the need to discharge the warming fluid.

14 Claims, 5 Drawing Sheets

(51) Int. Cl.
*F16L 39/00* (2006.01)
*F16L 59/18* (2006.01)
*F28D 7/10* (2006.01)
*F17C 9/02* (2006.01)
*F17C 5/06* (2006.01)

(52) U.S. Cl.
CPC .................. *F17C 9/02* (2013.01); *F28D 7/10* (2013.01); *F28D 7/103* (2013.01); *F28D 7/106* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2225/0123* (2013.01); *F17C 2225/035* (2013.01); *F17C 2227/032* (2013.01); *F17C 2227/0323* (2013.01); *F17C 2227/0393* (2013.01); *F17C 2265/05* (2013.01); *F17C 2270/0136* (2013.01)

(58) Field of Classification Search
CPC ....... F24J 3/084; F03G 2007/007; F03G 7/04; F03G 7/06; F03G 2313/002; F25B 2313/002; F17C 9/02; F17C 9/04; F17C 2227/0323; F17C 2225/035; F17C 2227/032; F17C 2227/03; F17C 2227/0393; F17C 2227/0309; F17C 2227/0316; F16L 39/00; F16L 39/005; F16L 59/182
USPC ................ 165/140–141, 143–144, 154–156; 62/260, 50.2; 60/641.1–641.2
See application file for complete search history.

(56) References Cited

U.S. PATENT DOCUMENTS

| | | | | |
|---|---|---|---|---|
| 3,580,330 A | * | 5/1971 | Maugis | F24J 3/085 165/135 |
| 3,857,244 A | * | 12/1974 | Faucette | F03G 7/04 165/45 |
| 4,094,356 A | * | 6/1978 | Ash | F24J 3/086 122/33 |
| 4,170,115 A | * | 10/1979 | Ooka | F17C 9/02 122/33 |
| 4,219,224 A | | 8/1980 | Hanley | |
| 4,448,244 A | * | 5/1984 | Demuth | F25B 29/003 165/141 |
| 5,390,500 A | | 2/1995 | White et al. | |
| 5,511,905 A | | 4/1996 | Bishop | |
| 6,739,140 B2 | | 5/2004 | Bishop | |
| 6,813,893 B2 | | 11/2004 | Bishop | |
| 6,848,502 B2 | | 2/2005 | Bishop | |
| 6,880,348 B2 | | 4/2005 | Bishop | |
| 6,945,055 B2 | | 9/2005 | Bishop | |
| 7,036,325 B2 | | 5/2006 | Bishop | |
| 8,069,678 B1 | | 12/2011 | Bernert | |
| 2005/0274126 A1 | * | 12/2005 | Baudat | F17C 5/06 62/50.2 |
| 2007/0079617 A1 | | 4/2007 | Farmer et al. | |
| 2007/0130963 A1 | * | 6/2007 | Morrison | F17C 5/06 62/50.2 |
| 2008/0115508 A1 | * | 5/2008 | Kotzot | F17C 7/04 62/50.2 |
| 2008/0296890 A1 | | 12/2008 | Prescott et al. | |
| 2009/0077982 A1 | * | 3/2009 | Brower | F16L 59/141 62/50.7 |

OTHER PUBLICATIONS

Garthwaite, Josie, "GTherm: Cutting Cost and Quakes from Geothermal Power", located at http://gigaom.com/2011/05/26/gtherm-cutting-cost-quakes-from-geothermal-power/, Mar. 26, 2011.
China Patent Application No. 201480015989.1, Office Action, dated Feb. 17, 2017, 16 pages.

* cited by examiner

X-Section @ Bottom

X-Section @ Bottom ized Natural Gas (LNG)

SYSTEMS AND METHODS FOR PROCESSING GEOTHERMAL LIQUID NATURAL GAS (LNG)

This application claims the benefit of priority of U.S. provisional application Ser. No. 61/752,885 filed on Jan. 15, 2013.

FIELD OF THE INVENTION

The field of the invention is regasification of liquid natural gas (LNG).

BACKGROUND

The following description includes information that may be useful in understanding the present invention. It is not an admission that any of the information provided herein is prior art or relevant to the presently claimed invention, or that any publication specifically or implicitly referenced is prior art.

Natural gas is a common fuel source that has many important applications. Natural gas is often transported in its liquid form, referred to herein as liquid natural gas (LNG), since it takes up much less volume. Upon arriving at its destination near a source of use (e.g., power plant) the LNG can be converted back into a gaseous state via a regasification process.

Numerous regasification devices, systems, and processes are known. For example, Conversion Gas Imports, L.P. ("CGI") is the owner of the following U.S. Patents related to regasification: U.S. Pat. Nos. 5,511,905; 6,739,140; 6,813,893; 6,880,348; 6,848,502, 6,945,055, 7,036,325. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

Some of the patents listed above describe designs for a LNG receiving terminal using salt cavern storage. The LNG may come directly from a ship or from a conventional storage tank. The LNG receiving terminal may be located onshore or offshore.

Some of these patents also describe methods for warming LNG and storage in compensated or uncompensated salt caverns, which is referred to as the Bishop Process™.

Some of the patents listed above also describe pipe-in-pipe heat exchanger designs. One embodiment of the LNG receiving terminal uses multiple salt caverns for blending of gas from different sources to achieve a pipeline standard BTU (i.e., British Thermal Units) content.

Unfortunately, current regasification technology suffers from numerous drawbacks. For example, some of the patents listed above describe systems in which a warming fluid (e.g., seawater) is discharged into the sea after use. The discharged fluid can have a negative impact on the environment (e.g., the discharged seawater is often too cold and can kill fish eggs, thus reducing the population of sea life).

The company GTherm has recently conceived of a new approach for power generation that relies on geothermal wells (see FIG. 1). The GTherm approach utilizes a closed-loop system and a circulating fluid. The circulating fluid is heated as it passes through a geothermal well and cools as it passes through an evaporator. GTherm has also conceived of applying similar principles to enhanced oil recovery systems. However, to the best of applicant's knowledge, those of ordinary skill in the art have failed to provide a closed-loop system with a circulating fluid that utilizes heat from geothermal wells for LNG regasification systems.

US20070079617 describes methods and systems for geothermal vaporization of liquefied natural gas. However, the system described in US20070079617 does not appear to provide a pipe-in-pipe heat exchanger to efficiently utilize heat from geothermal wells.

Thus, there remains a need for improved systems and methods for LNG regasification.

SUMMARY OF THE INVENTION

The inventive subject matter provides apparatus, systems, and methods for the warming of cold fluids, such as liquefied natural gas (LNG), using the heat from a geothermal energy heat source (e.g., geothermal well). In one aspect of some embodiments, a warming fluid (e.g., water, oil, brine, etc.) is circulated in a closed-loop system that passes through or near a geothermal energy heat source and then passes through a heat exchanger. As the warming fluid passes near the geothermal energy heat source, heat is transferred to the warming fluid. The warming fluid then passes through a heat exchanger where the warming fluid transfers heat to a liquid natural gas stream. The heat transferred from the warming fluid to the LNG stream helps to convert the LNG stream from a liquid state to a gaseous state as the LNG stream passes through the heat exchanger. The warming fluid is then circulated back to the geothermal energy heat source to repeat the process.

In one aspect of some embodiments, the heat exchanger comprises a pipe-in-pipe configuration, in which the LNG stream passes through an inner pipe and the warming fluid passes through an annular space around the exterior of the inner pipe. A portion of the length of the inner pipe has a bulkhead for stress and thermal expansion containment between cold LNG (upstream) and warm gas (downstream). The warming fluid crosses over the bulkhead section of the inner pipe via a bypass conduit (e.g., cross over piping).

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems, and methods for the regasification of liquid natural gas (LNG) using geothermal energy.

Figure 2:
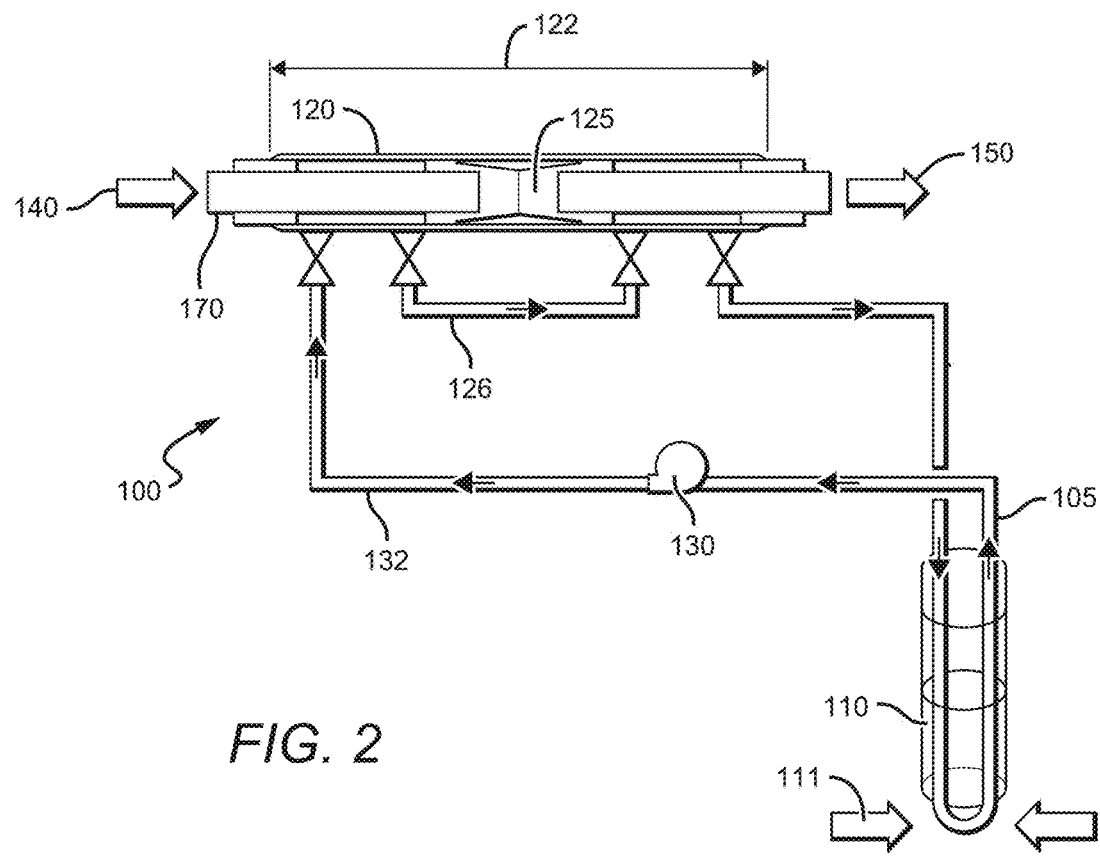
FIG. 2 is a schematic of a pipe-in-pipe LNG regasification system that utilizes geothermal energy.

FIG. 2 shows a general configuration and piping diagram for a LNG closed-loop regasification system 100. System 100 has a closed-loop conduit (e.g., fluid pathway) with a warming fluid 105 circulating therein. A pump 130 creates a negative pressure in the closed-loop conduit, causing the circulating fluid 105 to circulate through the geothermal well 110 and the heat exchanger 120, and through distribution piping 132. (Shut off and control valves, leak detection and controls instrumentation are not shown for clarity.) When passing through the geothermal well 110, the circulating fluid 105 is heated. The heat 111 is transferred to the LNG 140 flowing through the pipe-in-pipe heat exchanger 120, causing the LNG 140 to change from a liquid state to a gaseous state (e.g., natural gas 150). Distance 122 is the distance to turn LNG into natural gas and is dependent upon the heat transfer required.

The warming fluid 105 (also referred to as the circulating fluid) can be water, oil, brine, or any other fluid suitable for transferring heat under the required specifications. In some embodiments, the circulating fluid has a high heat capacity so that it retains heat over long distances and/or time.

Figure 1:
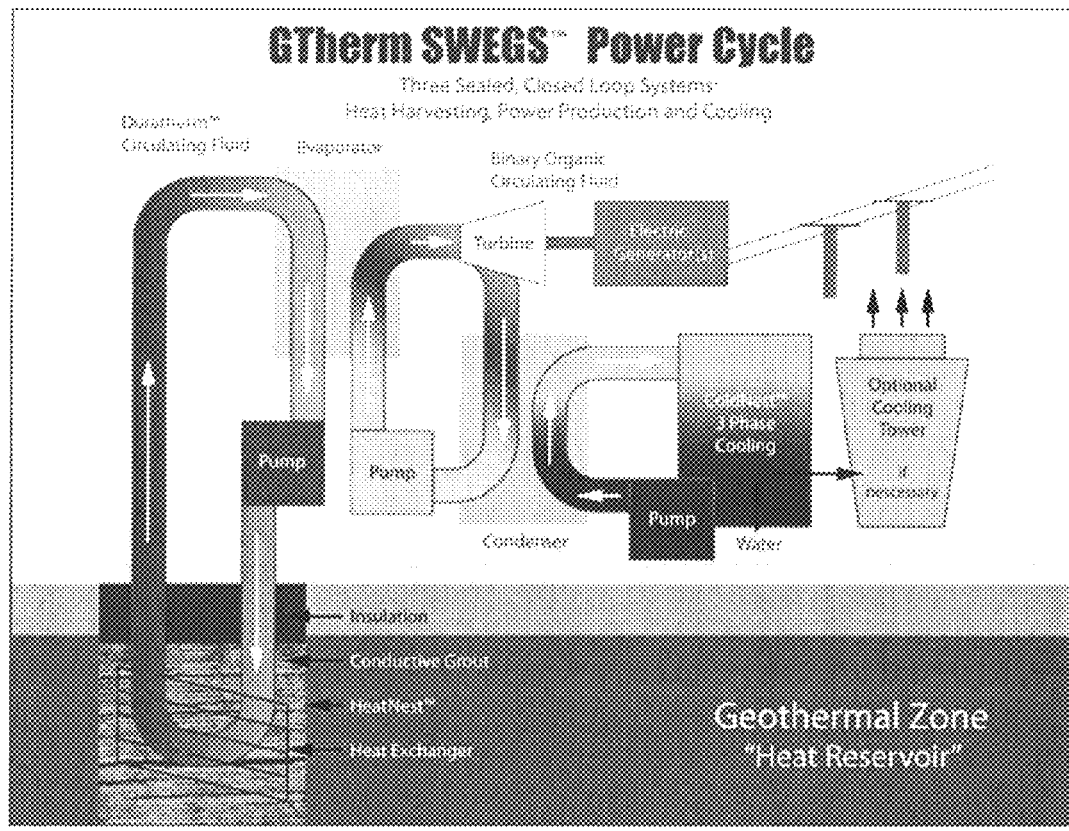
FIG. 1 is a schematic of a power generation process that utilizes geothermal energy.
Figure 3:
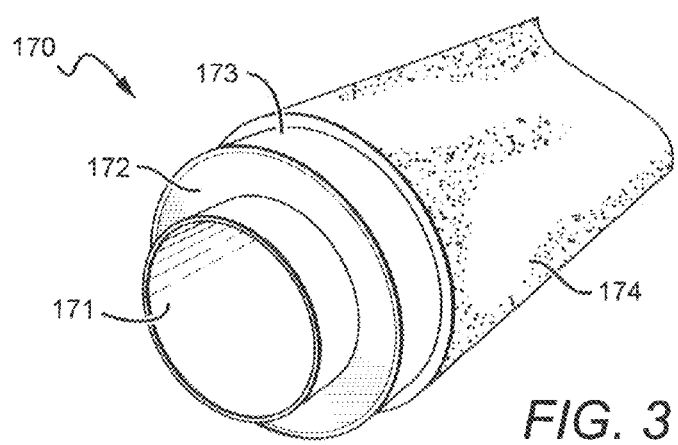
FIG. 3 is a perspective cross-sectional view of the pipe-in-pipe heat exchanger shown in FIG. 2.

Pipe 170 carriers LNG 140 from a LNG source to heat exchanger 120. FIG. 3 shows a cross-sectional view of a pipe 170. Pipe 170 comprises a cryogenic rated inner pipe 171 surrounded by an insulation material 172 (e.g., aerogel insulation, a suitable commercially-available example of which includes NANOGEL® EXPANSION PACK™, available from CABOT). Surrounding insulation material 172 is an external carbon steel casing pipe 173, however, another cryogenic rated pipe could be used if so required. Around pipe 173 is a concrete weight coating 174, if required. Various pipe configurations for transporting LNG are known and may be used with the inventive principles presented herein unless stated otherwise in the claims.

Figure 4:
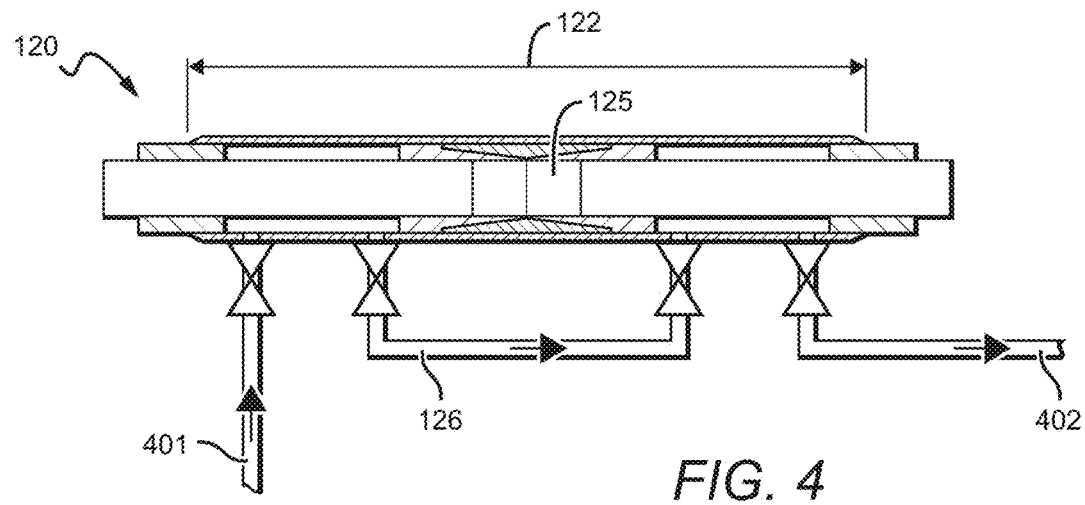
FIG. 4 is a side cross-sectional view of the pipe-in-pipe heat exchanger shown in FIG. 2.

FIG. 4 shows a side cross-sectional view of the pipe-in-pipe heat exchanger 120. Warming fluid 105 enters exchanger 120 at point 401 at a high temperature. Fluid 105 transfers heat to LNG 140 as it flows along distance 122 (fluid 105 flows in the inner pipe and warming fluid 105 flows in the annular space between the outer and inner pipe). Fluid 105 exits exchanger 120 at point 402 at a lower temperature than it was at point 401. Heat exchanger 120 has a bulkhead 125, which provides stress and thermal expansion containment as LNG 140 converts to natural gas 150. Fluid 105 crosses over bulkhead 125 via cross over piping 126.

Figure 5:
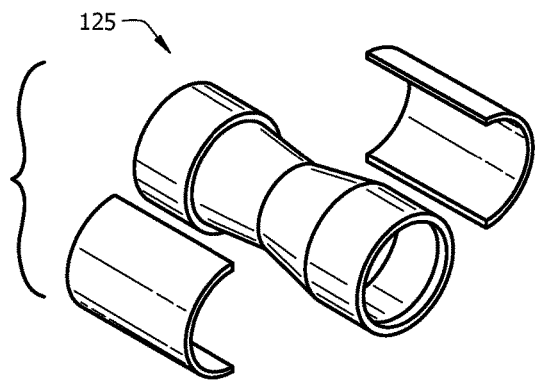
FIG. 5 is an exploded view of the pipe-in-pipe bulkhead configuration shown in FIG. 2.

FIG. 5 shows an exploded view of pipe bulkhead 125. Bulkhead 125 helps provide integrity to handle stress and thermal expansion containment between the cold LNG entering heat exchanger 120 and the warm natural gas (i.e., gaseous state) exiting heat exchanger 120. In some embodiments, the configuration of bulkhead 125 can be similar in principle to the pipe-in-pipe bulkhead described in WO2005119150, which is incorporated herein by reference. As illustrated in FIGS. 2, 4 and 5, the bulkhead 125 may be characterized as a tube having two longitudinal ends and a body portion between the first end and the second end that form two conical portions, the two conical portions converging at the smallest diameter of the respective conical portion, the body portion thereby having a longitudinal v-shaped cross sectional area.

Figure 6A:
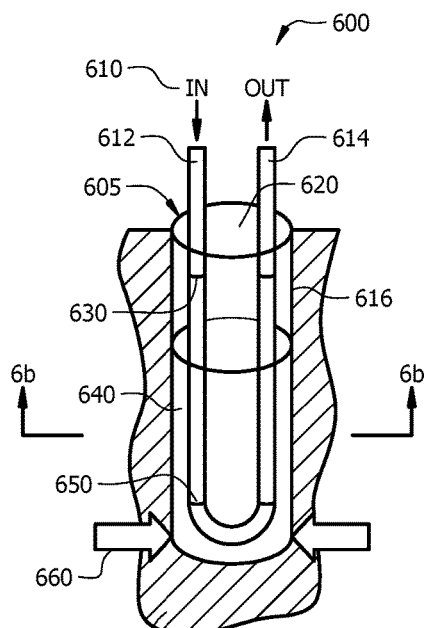
FIGS. 6a and 6b are perspective and cross-sectional views, respectively, of one embodiment of a geothermal well for use in a regasification system.
Figure 6B:
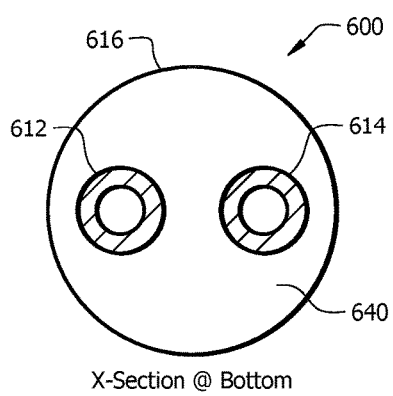

FIGS. 6a and 6b are perspective and cross-sectional views, respectively, of one embodiment of a geothermal well heat exchanger 600. The heat exchanger 600 comprises a pipe 616 that has an open hole 620 partially filled with thermal grout 640. Heat exchanger 600 is disposed within a geothermal region 670. The heat exchanger 600 also includes a u-shaped conduit (e.g., pipe) disposed within pipe 616 for circulating a fluid 610 into and out of the well (via inlet piping 612 and outlet piping 614). The u-shaped pipe is part of a closed-loop system 605 such as is shown in FIG. 2, and has at least one welded connection 650 at the elbow and at least one joint/weld 630 (e.g., screwed drill collar). Thermal grout 640 facilitates the transfer of heat 660 from geothermal region 670 to the warming fluid 610. The exact configuration (e.g., size, dimension, shape, materials, temperatures) of the conduit will vary depending on the application. FIG. 6b provides examples of diameters, weights, materials, and specifications, which are not intended to limit the application of the inventive concepts described herein. In this particular embodiment, pipe 616 is casing pipe that has a 30 inch outer diameter (OD) and 1 inch width, and inlet 612 and outlet 614 have a 4 inch inner diameter and 2 inch width.

Figure 7:
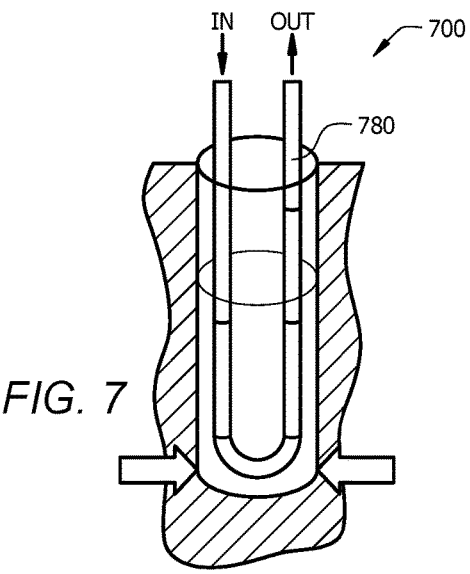
FIG. 7 is a perspective view of the geothermal well of FIG. 6a with an optional vacuum insulated tubing.

FIG. 7 shows a perspective view of an alternative embodiment 700 of the geothermal well 600 of FIG. 6a, with an optional vacuum insulated tubing 780 near the top end of the well.

Figure 8A:
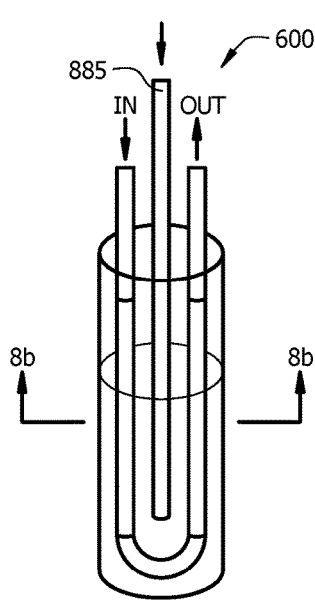
FIGS. 8a and 8b are perspective and cross-sectional views, respectively, of a geothermal well with a grout tube for installing thermal grout.
Figure 8B:
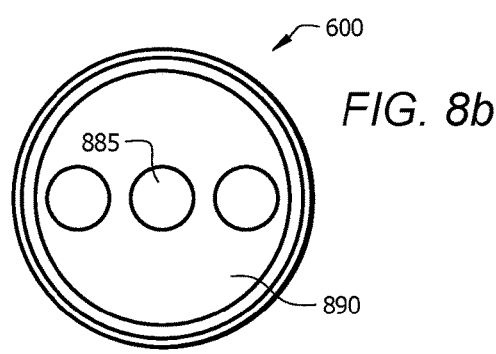

FIGS. 8a and 8b are perspective and cross-sectional views, respectively, of the geothermal well 600 of FIG. 6 with a removable grout tube 885 in the center of the well and a spacer 890 for installing thermal grout in the bottom end of the well.

Figure 9A:
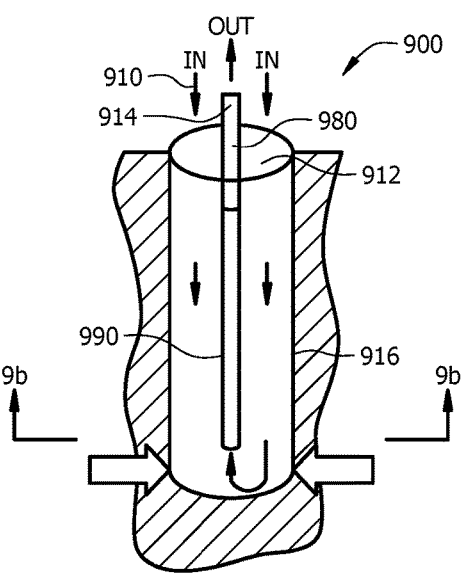
FIGS. 9a and 9b are perspective and cross-sectional views, respectively, of another embodiment of a geothermal well for use in a regasification system.
Figure 9B:
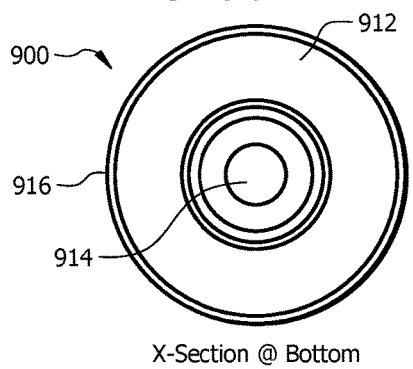

FIGS. 9a and 9b are perspective and cross-sectional views, respectively, of another embodiment of a heat exchanger 900 in a geothermal well for use in a regasification system. The well comprises a cased hole 916 grouted in place and a vacuum insulated tubing 980 in the center. The circulating fluid 910 flows into the geothermal well through the cased hole 912 (e.g., annular space) and out of the center vacuum tubing 980 (via the open bottom of return line/pipe 914). Spacers and centralizers 990 keep return line/pipe 914 centered.

Figure 10D:
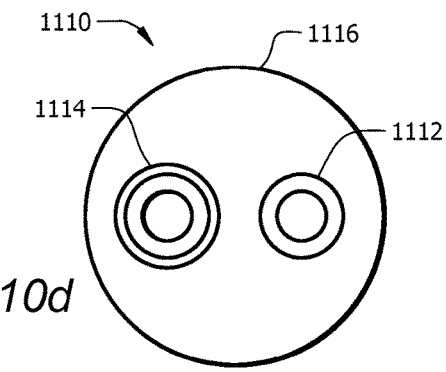
FIGS. 10a-10e are various views of another embodiment of a geothermal well for use in a regasification system.
Figure 10A:
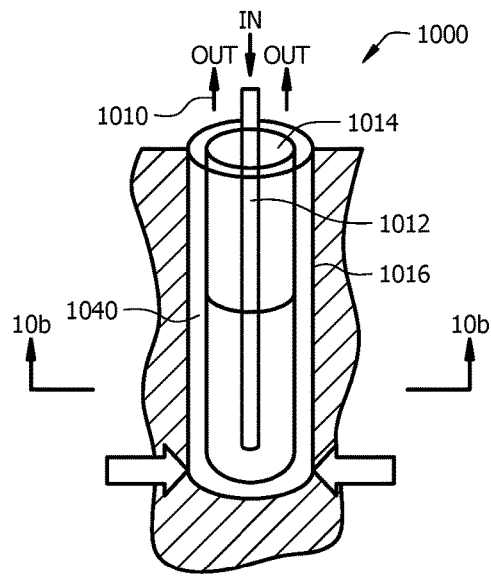
Figure 10B:
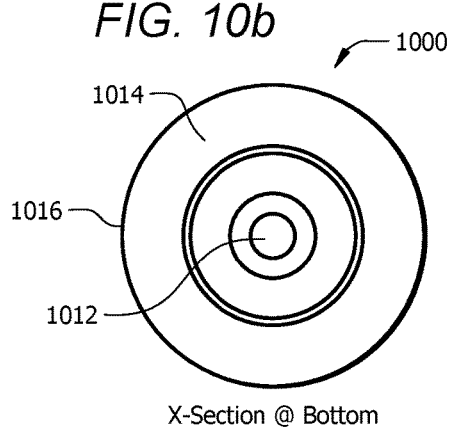

FIGS. 10a-10b show various views of an alternative embodiment 1000 of heat exchanger 900 in a geothermal well for use in a regasification system. The well comprises a center vacuum insulated tube 1012 with an open end near the bottom of the well. The well also includes an outer casing 1016 surrounded by thermal grout 1040. The circulating fluid 1010 flows into the well via the center tube 1012 and out of the well via the casing 1016 (e.g., annular space 1014).

Figure 10C:
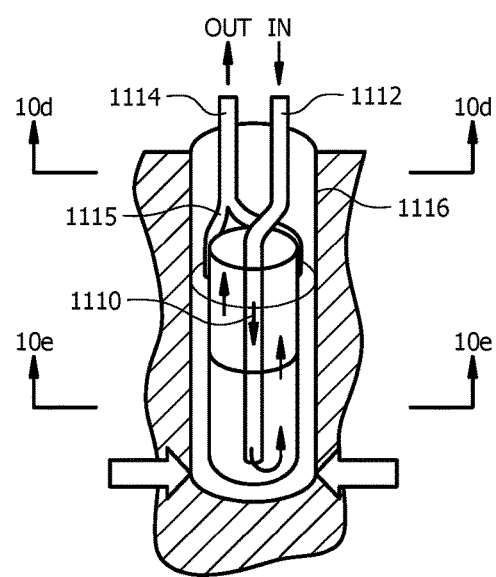

FIG. 10c shows a heat exchanger 1110 what has a manifold 1115 at the top end of the well. The manifold 1115 brings the casing 1116 outer diameter space into one smaller diameter tubing 1114. A granular insulation can be used around the exterior surface of the manifold and within the casing. Heat exchanger 1110 has a center pipe 1112 that provides an inlet.

Figure 10E:
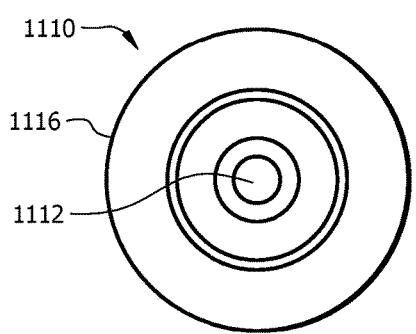

FIGS. 10d and 10e show cross sectional views near the top end and bottom end, respectively, of the geothermal well.

Grout 111, developed by Brookhaven National Laboratories specifically for geothermal applications, is one example of a grout that can be used with geothermal wells. Unlike other grouting materials, Grout 111 is virtually water impermeable, is shrink resistant, is crack resistant, and boasts the highest known heat conductivity of any other known grout in existence.

A newer grout, called Mix 111, can also be used. Mix 111 is composed of cement, water, silica sand and small amounts of super plasticizer and bentonite. The formula for Mix 111 has been publically provided by Brookhaven National Laboratories.

By utilizing this material, and grouting from the bottom up, a total seal around the well is provided. This both protects the tubing and provides a safe sealant to prevent the cross-contamination of underground aquifers at varying depths.

The systems and methods described herein are useful for a LNG import situation where there is a need for a regasification system from a LNG tanker at a berth, where the LNG can be converted in the pipeline running from the shop to shore and an onshore natural gas grid. The systems and methods described herein can also be used for heat-upon-demand applications.

In addition, the systems and methods described herein can also be used for a re-gas system for a LNG plant where LNG is stored over time and natural gas is needed to enter a pipeline grid (e.g., a peak shaving plant). The systems and methods could be used in a LPG (liquefied petroleum gas) system as well, although the temperatures are lower.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A regasification system comprising:
   a liquefied natural gas source;
   a geothermal well; and
   a pipe-in-pipe heat exchanger comprising:
      a first pipe, wherein the first pipe is formed from a cryogenic-rated material;
      a second pipe;
      a first coupling that couples an end of the first pipe with an end of the second pipe, and comprising (i) a tube having a first end and a second end, the first end and the second end each having an inner diameter sized and dimensioned to respectively receive an outer diameter of the end of the first pipe and an outer diameter of the end of the second pipe, and wherein the tube has a body portion between the first end and the second end that form two conical portions, the two conical portions converging at the smallest diameter of the respective conical portion, the body portion thereby having a longitudinal v-shaped cross sectional area, and (ii) a first sleeve encasing a portion of the v-shaped cross-sectional area;
      a second sleeve encasing at least a portion of the first pipe, at least a portion of the second pipe, and the first coupling;
      a first internal chamber defined by a radial space between an inner surface of the second sleeve and an outer surface of the first pipe;
      a second internal chamber defined by a radial space between an inner surface of the second sleeve and an outer surface of the second pipe;
      wherein the first internal chamber and second internal chamber are fluidly coupled via a second coupling;
      an inlet fluidly coupled with the first internal chamber for receiving a warming fluid; and
      an outlet fluidly coupled with the second internal chamber for disposing the warming fluid,
   wherein the regasification system is configured to circulate the warming fluid in a closed-loop comprising the geothermal well and the pipe-in-pipe heat exchanger, and wherein the pipe-in-pipe heat exchanger is configured to receive liquefied natural gas from the liquefied natural gas source and to heat the liquefied natural gas via heat-exchange with the warming fluid.

2. The system of claim 1, wherein the second pipe is formed from a non-cryogenic-rated material.

3. The system of claim 1, wherein the second coupling comprises a third pipe externally disposed with respect to the second sleeve and fluidly coupled with the first and second internal chambers.

4. The system of claim 1, wherein the second coupling is internally disposed with respect to the second sleeve.

5. The system of claim 1, further comprising a grout disposed in the geothermal well.

6. The system of claim 1, wherein at least a portion of the closed-loop comprises piping that is insulated and is disposed in the geothermal well.

7. The system of claim 1, wherein the warming fluid comprises water, an oil, or a brine.

8. A method of regasifying liquefied natural gas, the method comprising:
   receiving the liquefied natural gas from a liquefied natural gas source;
      pumping a warming fluid from a geothermal well to a pipe-in-pipe heat exchanger, the pipe-in-pipe heat exchanger comprising: a first pipe, wherein the first pipe is formed from a cryogenic-rated material;
      a second pipe;
      a first coupling that couples an end of the first pipe with an end of the second pipe, and comprising (i) a tube having a first end and a second end, the first end and the second end each having an inner diameter sized and dimensioned to respectively receive an outer diameter of the end of the first pipe and an outer diameter of the end of the second pipe, and wherein the tube has a body portion between the first end and the second end that form two conical portions, the two conical portions converging at the smallest diameter of the respective conical portion, the body portion thereby having a longitudinal v-shaped cross sectional area, and (ii) a first sleeve encasing a portion of the v-shaped cross-sectional area;
      a second sleeve encasing the first pipe, the second pipe, and the first coupling;
      a first internal chamber defined by a radial space between an inner surface of the second sleeve and an outer surface of the first pipe;
      a second internal chamber defined by a radial space between an inner surface of the second sleeve and an outer surface of the second pipe;
      wherein the first and second internal chambers are fluidly coupled via a second coupling;
      an inlet fluidly coupled with the first internal chamber for receiving the warming fluid; and
      an outlet fluidly coupled with the second internal chamber for disposing the warming fluid,
   heating the liquefied natural gas by passing the liquefied natural gas through the pipe-in-pipe heat exchanger; and
   pumping the warming fluid back to the geothermal well for heating.

9. The method of claim 8, wherein the second pipe is formed from a non-cryogenic-rated material.

10. The method of claim 8, wherein the second coupling comprises a third pipe externally disposed with respect to the second sleeve and fluidly coupled with the first and second internal chambers.

11. The method of claim 8, wherein the second coupling is internally disposed with respect to the second sleeve.

12. The method of claim 8, further comprising a grout disposed in the geothermal well.

13. The method of claim 8, wherein at least a portion of the closed-loop comprises piping that is insulated and is disposed in the geothermal well.

14. The method of claim 8, wherein the warming fluid comprises water, an oil or a brine.

* * * * *